United States Patent [19]

Brajczewski et al.

[11] Patent Number: 5,422,877
[45] Date of Patent: Jun. 6, 1995

[54] DUAL BUS SWITCHING

[75] Inventors: David C. Brajczewski, Vernon; James P. Towey, Jr., Bristol, both of Conn.

[73] Assignee: Otis Elevator Company, Farmington, Conn.

[21] Appl. No.: 70,129

[22] Filed: Jun. 1, 1993

[51] Int. Cl.⁶ .................. H04Q 11/00; H04J 15/00
[52] U.S. Cl. ...................... 370/16; 370/85.2; 340/825.01; 371/8.2; 371/67.1; 375/347; 455/133
[58] Field of Search .............. 370/13, 16, 16.1, 17, 370/53, 54, 58.1.60, 67, 85.1, 85.2, 85.9, 85.13, 94.1, 112; 340/825.01, 825.02, 825.06, 825.16; 371/8.1, 8.2, 37.1, 47.1, 48, 67.1, 72; 375/40, 100; 455/133, 135

[56] References Cited

U.S. PATENT DOCUMENTS

| | | | |
|---|---|---|---|
| 4,144,410 | 3/1979 | Flickinger et al. | 370/16.1 |
| 4,532,625 | 7/1985 | Stover | 370/16 |
| 4,543,654 | 9/1985 | Jones | 370/94.1 |
| 4,752,927 | 6/1988 | Melling, Jr. | 370/16 |
| 5,027,350 | 6/1991 | Marshall | 370/85.13 |
| 5,251,203 | 10/1993 | Thompson | 370/94.1 |

Primary Examiner—Alpus Hsu

[57] ABSTRACT

A multiplexer receives a message from a first bus and a message from a second bus, wherein a preamble is received at the head of each message, compares the preamble from each bus against an ideal preamble and, prior to receiving the next bit in either message, provides to a transceiver the message which is least noisy as indicated by the comparison; if the preamble in the message on the bus presently selected for reception by the transceiver does not compare favorably with the ideal preamble, the message from the other bus is selected.

2 Claims, 11 Drawing Sheets

BUS ADDRESS

| CBA | | GBA | |
|---|---|---|---|
| 0 | NONE | 0 | BLDG BUS |
| 1 | CAR BUS 1 | 1 | GROUP BUS 1 |
| 2 | CAR BUS 2 | 2 | GROUP BUS 2 |
| . | . | . | . |
| . | . | . | . |
| . | . | . | . |
| 10 | CAR BUS 10 | 10 | GROUP BUS 10 |
| 11 | UNUSED | 11 | UNUSED |
| 12 | UNUSED | 12 | UNUSED |
| 13 | UNUSED | 13 | UNUSED |
| 14 | UNUSED | 14 | UNUSED |
| 15 | ALL CAR BUSES | 15 | ALL GROUP BUSES |

FIG.8

CAR BUS

| NODE | LOCAL ADDRESS |
|---|---|
| CAR/GROUP BUS CONTROLLER | 0 |
| OCSS | 1 |
| MCSS | 2 |
| DCSS | 3 |
| DBSS | 4 |
| CAR ELD | 5 |
| HALL ELD'S (64 TOTAL*) | 6-70 |
| UNUSED | 71-255 |

CURRENT OCSS SERVICES A MAXIMUM OF 64 FLOORS.

GROUP BUS

| NODE | LOCAL ADDRESS |
|---|---|
| GROUP/BUILDING BUS CONTROLLER | 0 |
| CAR/GROUP BUS CONTROLLER | 1-10 |
| ADS1 | 13 |
| ADS2 | 14 |
| EMS MACHINE ROOM INTERFACE | 15 |
| UNUSED | 16-255 |

BUILDING BUS

| NODE | LOCAL ADDRESS |
|---|---|
| GROUP/BUILDING BUS CONTROLLER | 1-1 |
| EMS | 11 |
| SEC | 12 |
| REM | 13 |
| UNUSED | 0,14-255 |

FIG.9

DUAL BUS SWITCHING

TECHNICAL FIELD

The present invention relates to a switch for selecting a message from one of two buses.

BACKGROUND OF THE INVENTION

Sometimes a bus is faulty and provides erroneous messages to a transceiver. A solution is to provide two redundant buses which both provide the same messages to the transceiver, observe the number of erroneous messages on each bus, and if the erroneous messages on one bus exceed a limit, then the other bus is selected for providing messages to the transceiver.

DISCLOSURE OF THE INVENTION

It is an object of the present invention to minimize the effects of a faulty communications bus.

According to the present invention, a multiplexer receives a message from a first bus and a message from a second bus, wherein a preamble is received at the head of each message, compares the preamble from each bus against an ideal preamble and, prior to receiving the next bit in either message, provides to a transceiver the message which is least noisy as indicated by the comparison; if the preamble in the message on the bus presently selected for reception by the transceiver does not compare favorably with the ideal preamble, the message from the other bus is selected.

The advantage of the present invention is that as the multiplexer can switch from one bus to another on a message by message basis, a message is always provided to a transceiver and no time is wasted receiving and counting bad messages.

BRIEF DESCRIPTION OF THE DRAWING

FIG. 8 is a bit map of a message status byte.

FIG. 9 is a table listing conditions for acceptance of a message packet by the receive machine.

BEST MODE FOR CARRYING OUT THE INVENTION

The use of the term "layer" fairly comports with the layers of the ISO communication standard discussed in *Computer Networks* by Tanenbaum, 2d ed., (1989) pages 208–212.

Figure 1A:
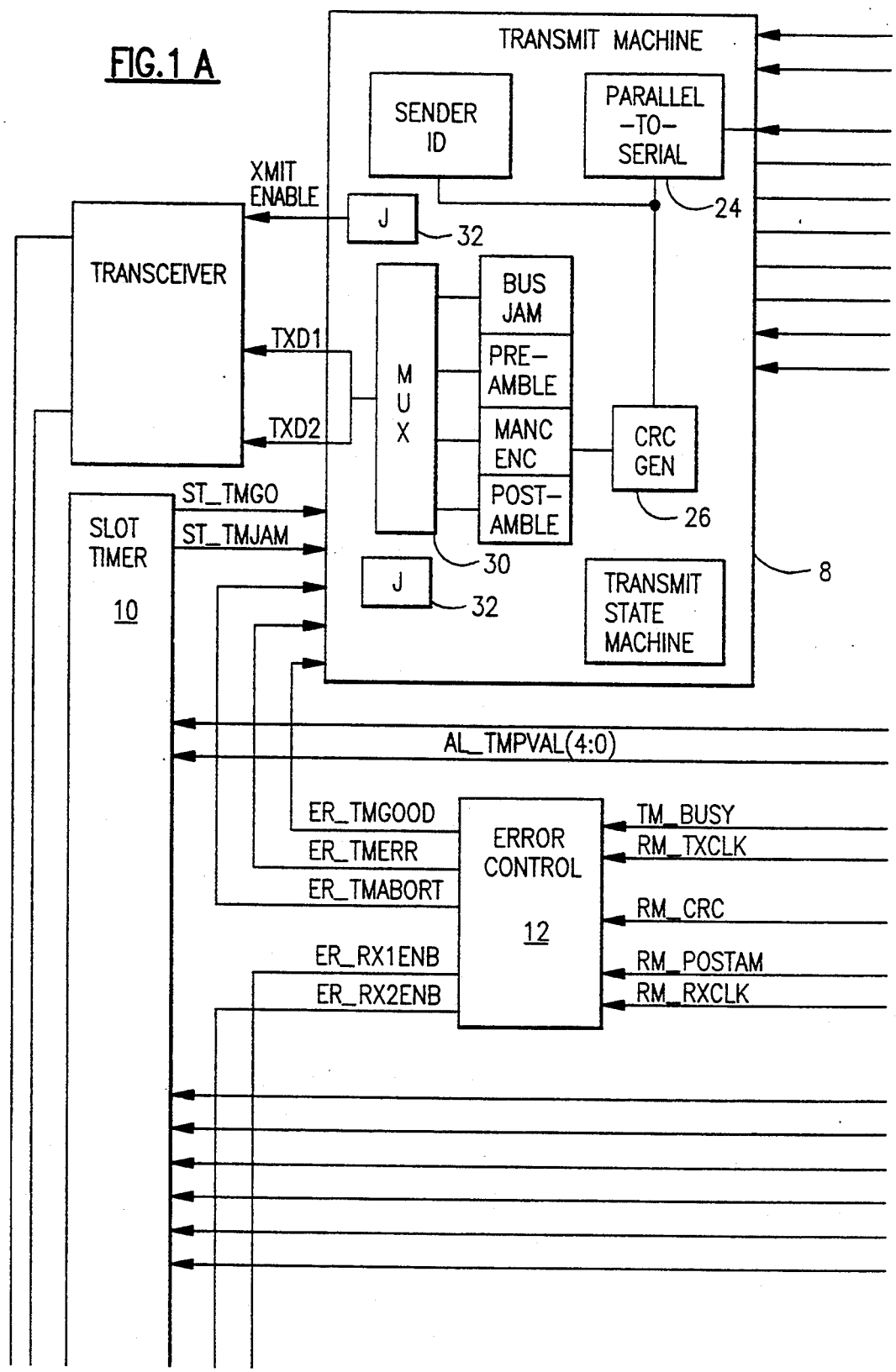
FIG. 1 is a block diagram of a communications co-processor (CC) for transmitting and receiving messages on a bus.
Figure 1B:
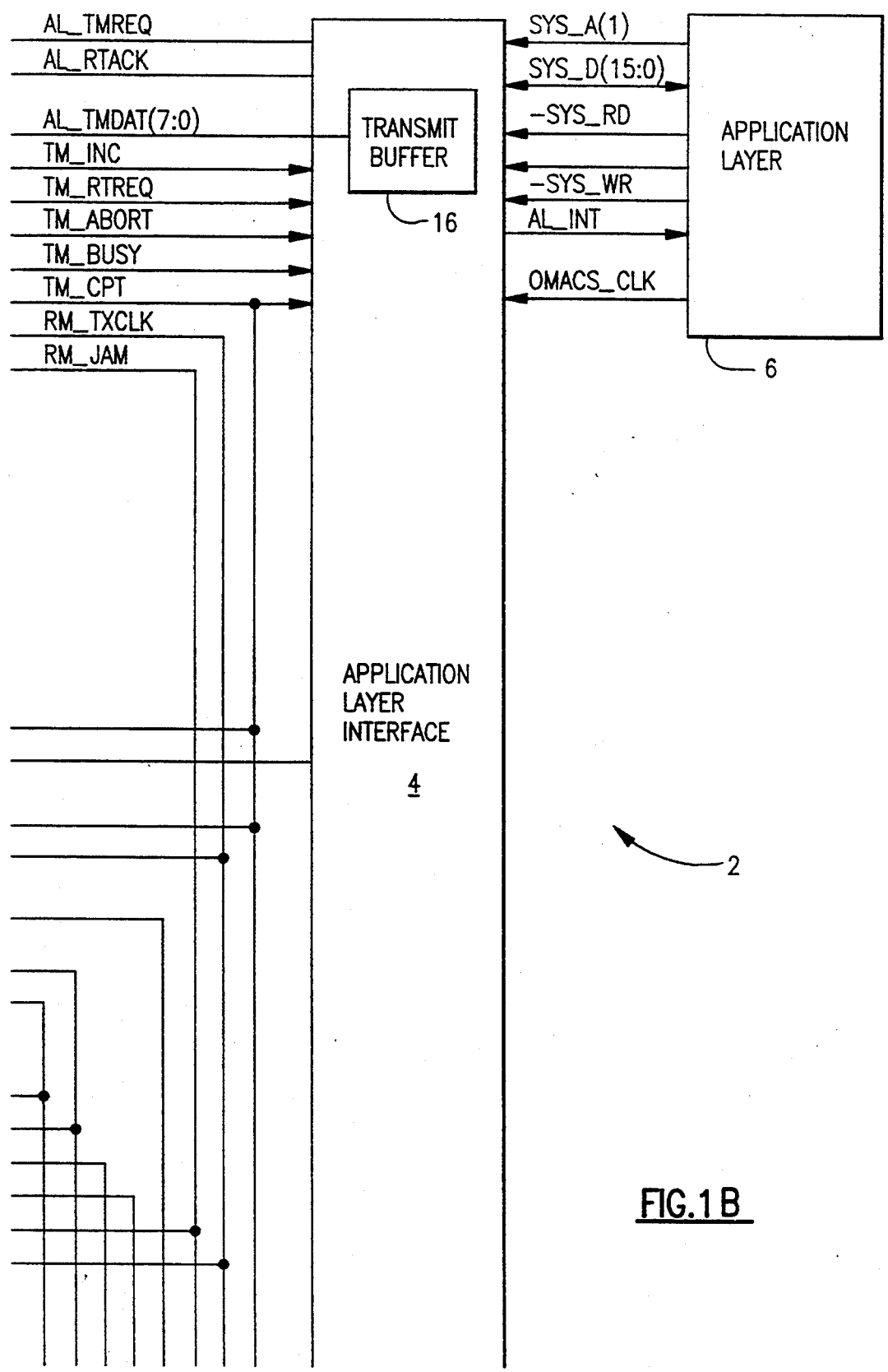
Figures 1, 1C:
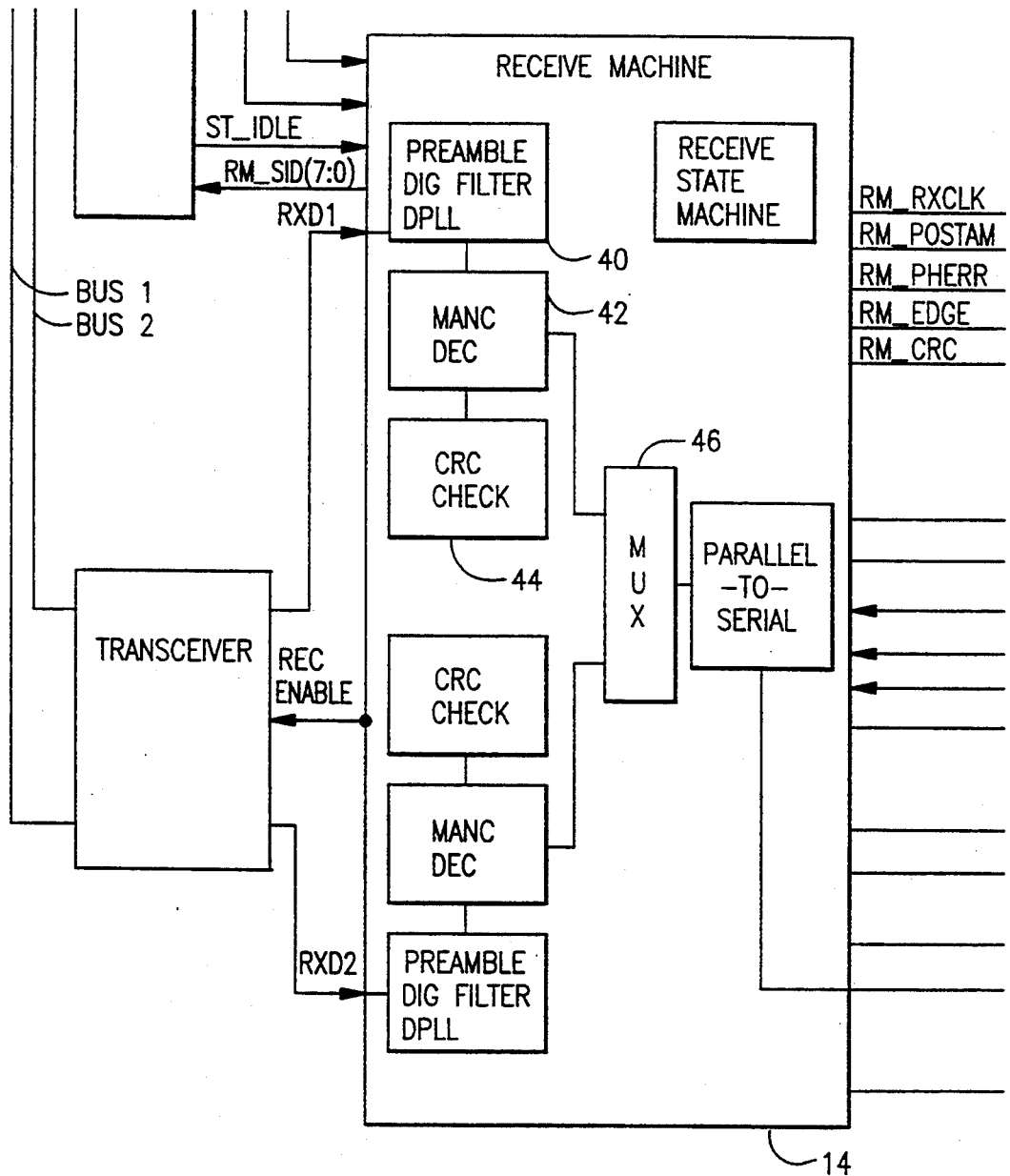
Figure 1D:
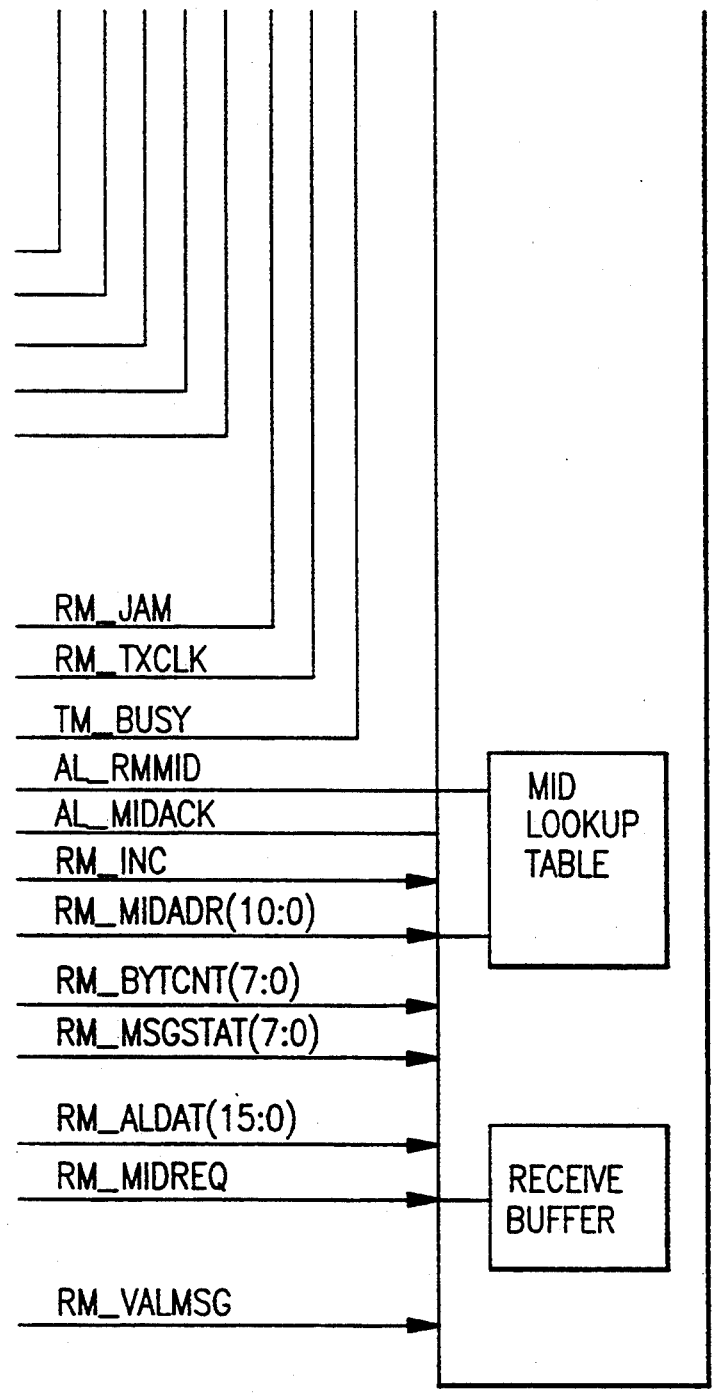

FIG. 1 shows a communications co-processor (CC) 2 for transmitting and receiving a message. The CC 2 includes (a) an applications layer interface (ALI) 4 for interfacing the CC 2 and an applications layer (AL) 6, (b) a transmit machine (TM) 8 for receiving messages from the ALI 4 and transmitting them onto a bus (Bus 1 or Bus 2), (c) a slot timer (ST) 10 for indicating to the TM 8 that (i) a current time slot on the bus (Bus 1 or Bus 2) for transmitting messages is the one assigned to it and that (ii) the bus is being used, and (d) an error control (EC) 12 for (i) tracking errors or (ii) reporting errors, and (e) a receive machine (RM) 14 for receiving messages and passing these on to the ALI 4 which sends them to the AL 6. The AL 6, for example, includes a signal host processor for an elevator motion or drive control.

Message transmission proceeds generally as follows. First, the ALI 4 sends an application layer interrupt signal AL_INT to the AL 6, signaling that the ALI 4 is available to be written into. Next, the AL 6 writes the message into the ALI 4 by means of the address, data and write signals SYS_A, SYS_D, and SYS_WR. Third, a transmit-buffer-loaded signal within the 16-bit SYS_D (15:0) signal tells the ALI 4 that the AL 6 has loaded a message into a transmit buffer (TB) 16 of the ALI 4. Fourth, the ALI 4 sends a transmission request signal AL_TMREQ to the TM 8 for telling the TM 8 that the TB 16 has a message. Fifth, if the TM 8 is not busy, indicated when a signal TM_BUSY from the TM 8 is not set, the TB 16 loads the TM 8 with a data signal AL_TMDAT including the message, a control byte, data, an MID data signal, and LA and BA fields. The TM 8 provides an increment signal TM_INC to the ALI 4 to get each new byte of the message in the TB 16. After the message exits the TB 16, it is converted to serial form in a parallel to serial converter in the TM 8. Sixth, the message is transmitted redundantly on two buses (Bus 1, Bus 2) by means of signals TXD1, TXD2 (TX is a common abbreviation for transmitting, transmit or transmission). Seventh, when the transmission is complete, the TM 8 provides a transmit complete signal TM_CPT to the ALI 4 and to the EC 12. The invention is explained in more detail below.

The AL 6 may not delete data in the TB 16 while the transmission is taking place, that is, while the TM_BUSY signal is being provided from the TM 8.

The AL 6 sends, within the SYS_D (15:0) signal to the ALI 4, (a) a priority level signal for indicating priority level of the message and (b) a priority signal for indicating that the message includes a priority message. If the ALI 4 has not received the interrupt signal ALI_INT for a long time and the AL 6 has a priority message, the AL 6 may flush data in the TB 16, in order to replace it with the priority message, by means of a flush bit within the SYS_D signal. The priority level signal is passed on as the signal AL_TMPVAL to the ST 10.

Whether a message is transmitted depends on two signals the TM 8 receives from the ST 10: ST_TMJAM and ST_TMGO. ST_TMJAM tells the TM 8 that the bus is idle and that a jam signal must precede a transmission onto the bus (Bus 1 or 2). ST_TMGO tells the TM 8 that the current slot is the slot assigned to it and therefore the bus is available to it. If the TM 8 receives ST_TMGO and a message is stored in the ALI 4, the TM 8 will transmit a message signal TXD1, TXD2 onto the bus. While the TM 8 is transmitting, the TM 8 sets high TM_BUSY to indicate to the ALI 4, ST 10, EC 12, and RM 14 that the TM 8 is busy.

If the TM 8 learns from the ST 10 that the bus is idle, transmission of a message is preceded by transmission of a bus jam signal as the header for TXD1, 2. The bus jam signal drives the bus from a high impedance state to a low impedance state for a minimum of two-bit times and then back to a high impedance state. The bus jam signal is provided when the ST 10 does not receive for a given time: (i) an RM_EDGE signal from the RM 14 for indicating edges in the received signal, (ii) a postamble signal RM_POSTAM from the RM 14, and (iii) an RM_JAM signal from the RM 14 when the network is jamming all these, indicating that the bus is idle.

Figure 3:
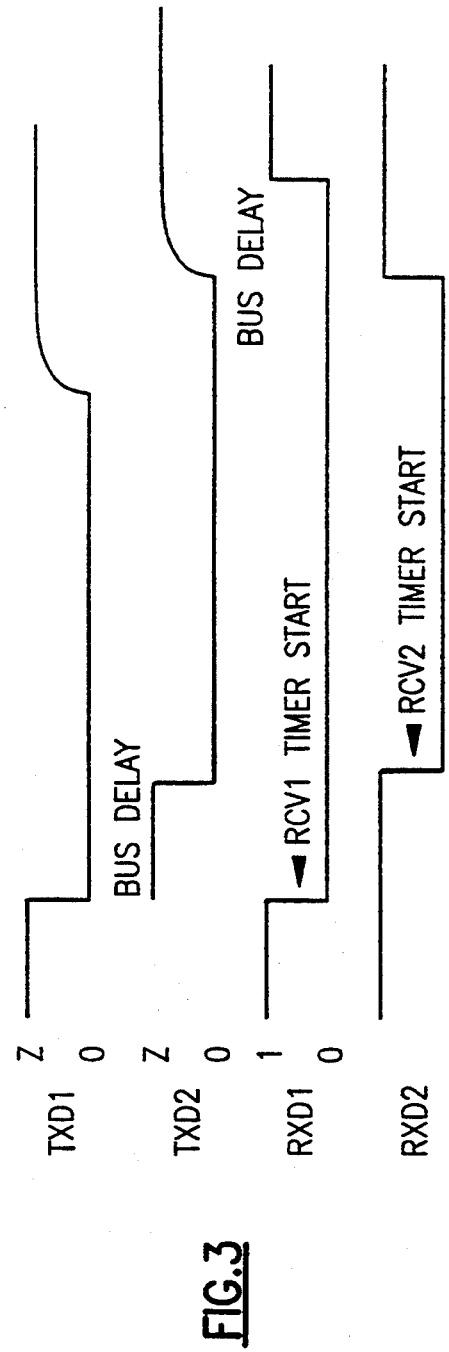
FIG. 3 is a timing diagram of signals transmitted and received by the RS485 drivers and receive machines of FIG. 2.
Figure 2:
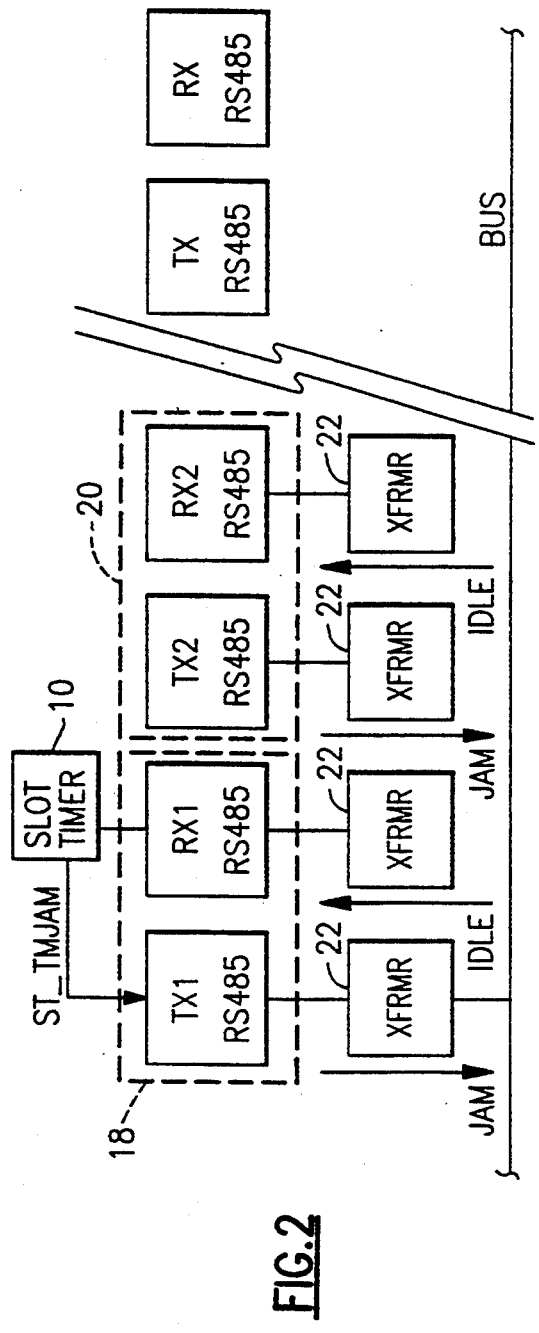
FIG. 2 is a block diagram of RS485 drivers and receive machines when a jam signal is put on the bus.
Figure 4:
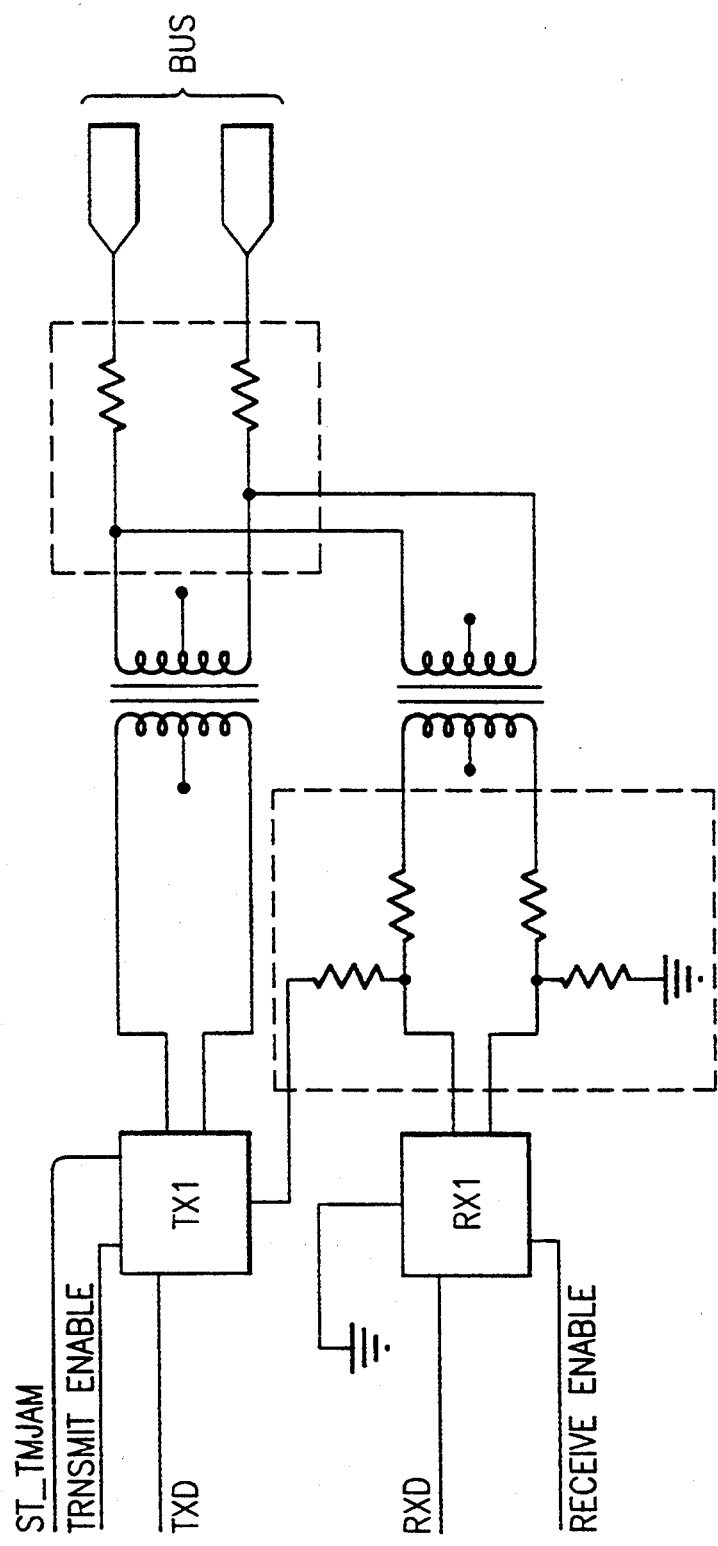
FIG. 4 is a circuit of a transceiver including an RS485 driver and an RS485 receive machine for connection to the CC.

FIGS. 2–4 describe bus jamming. FIG. 2 shows two transmitter/receiver pairs TX1/RX1 18, TX2/RX2 20 (RX is a common abbreviation for receiving or receive) when a jam signal is being put on the bus. TX (1 or 2) corresponds to TM 8 and RX (1 or 2) corresponds to RM 14. Each transmitter TX is an RS485 line driver according to the known Electronic Industries Association (EIA) standard; similarly, each RM 14 is an RS485 receive machine in accordance with the EIA standard. When the first receive machine RX1 detects that bus 1, 2 is idle, the first transmitter TX1 jams the bus prior to sending a message. If the second receive machine RX2 detects a jam prior to the second transmitter TX2, providing a second jam signal onto the bus, receive machine RX2 prevents the second transmitter TX2 from jamming the bus. If, however, the second receive machine RX2 does not detect a bus jam prior to the second transmitter TX2 jamming the bus, then the second transmitter TX2 jams the bus. The first receive machine RX1 and transmitter TX1 and second receive machine RX2 and transmitter TX2 are all transformer-coupled to the bus. The transformer (XFRMR) 22 minimizes the direct current common mode voltage provided to the RS485 from the bus.

FIG. 3 shows the outputs TXD1, 2 of the transmitters TX1, TX2 while the previously idle bus is being jammed and the inputs RXD1, 2 while the bus is being jammed. FIG. 3 shows TX1 jamming the bus as described above by driving a negative voltage onto the bus, which is in a high impedance state when idle. If transmitter TX2 jams the bus before receive machine RX2 receives the bus jam signal from transmitter TX1 (one bus delay after TX1 jams), then the RS485 drivers are not damaged because according to the invention, they drive the bus in the same direction, rather than opposite directions. This avoids the need for thermal protection circuitry. If TX1, 2 drive the bus in opposite directions, for example, TX1 jammed low and TX2 jammed high, TX1 and TX2 might be damaged without thermal protection circuitry.

Each CC 2 is synchronized within a propagation delay when, on receipt of the first jam signal, all receive machines RX transition from high to low in response to the first jam signal and remain in the low state even when they receive a second bus jam signal.

FIG. 4 shows TX1 and RX1 and accompanying circuitry. When the RS485 TX1 receives a transmit enable signal, ST_TMJAM, a bus jam signal is provided. Through a fault isolation circuit, this bus jam signal drives low the voltage across the bus lines which is normally high when the bus is idle. This low voltage is detected at the inputs to the receiving RS485 RX1. The result is that the output from the RM 14, which is high when the bus is idle, becomes low.

Returning to FIG. 1, when the message goes from a parallel to serial converter 24, a preamble is prepended to the message (after a bus jam, if one is provided). The preamble is provided when the TM 8 receives the ST_TMGO signal from the ST 10, indicating that the slot assigned to this node is the current slot. The preamble is four-bit times long and consists of a signal low in the first half of the first bit and high in the second half of the second bit, low in the second bit, low in the first half of the third bit, and high during the second half of the third bit and the fourth bit. The preamble is used by receive machines to delimit the start of a message and to establish bit synchronization within a message.

As the message is being converted from parallel to serial form, the message, except for the preamble and a frame postamble, is passed through a cyclic redundancy check generator 26 where a check sum is appended to the message. The CRC-16 cyclic redundancy code will be used $(X^{16}+X^{15}+X^2+1)$, where X is a generator polynomial as described in Tanenbaum, *Computer Networks*, 2d ed. (1989), pages 208–212.

In FIG. 1, the message is Manchester encoded as it is being transmitted. In this coding scheme, the first half of a bit cell contains the complementary data and the second half contains the true data. The transition is guaranteed in the middle of each bit cell, providing for self-clocking. Every bit cell is also 50% high and 50% low, providing a DC component when averaged over several bit times, making Manchester encoding compatible with transformer coupling.

A frame postamble is appended 28 to the check sum portion of the message; the postamble is a logical one broadcast for two-bit times used by RM 14 to delimit the end of a message.

In FIG. 1, a multiplexer (MUX) 30 combines the bus jam, preamble, and message (including sender ID, control byte, MID, LA, BA, CRC byte) and postamble for transmitting them onto buses 1, 2.

While the message is being transmitted, a jabber detect circuit 32 measures the duration of the message. The jabber detect circuit 32 is a timer which is started when it receives TM_BUSY. The jabber detect circuit 32 is responsive to a CG_JAB count signal, a time-out period which represents an interval greater than the longest possible message. An attempt by the TM 8 to maintain control of the media for a time greater than the jabber detect time-out period is prohibited by the jabber detect circuit 32, causing an abort signal, TM_ABORT, to be provided to the transmit state machine (TSM) for commanding abortion of a transmission.

Finally, the message TXD1, 2 is provided from the CC 2 to a transceiver (e.g., TX1/RX1 of FIG. 4). Following transmission, the TM 8 sets low TM_BUSY and clears TM_CPT (the message indicating that the transmission is complete), TM_RTREQ (a message indicating to the TB 16 that a retransmission is requested), TM_ABORT, AL_RTACK (an acknowledgment signal from the AL 6 that a retransmission request has been received from the TM 8), ER_TMABORT (a signal from the error control for informing the TM 8 that transmission is to be aborted because the number of retransmissions requested exceeds the number allowed) and ER_TMERR (a signal for indicating that an error in transmission has occurred).

After transmission, the TM 8 receives one of three signals from the EC 12: a transmission good signal ER_TMGOOD, a transmission error signal ER_TMERR, and an abort signal ER_TMABORT. If the number of retransmit errors has exceeded a limit, the TM 8 sets TM_ABORT, TM_CPT, and clears the request signal AL_TMREQ from the TB 12 to the TM 8. If, however, the transmission is good, the abort signal TM_ABORT is not set and the error bit ER_TMERR is not set either, so transmission is complete and the TM 8 sets TM_CPT and AL_TMREQ is cleared. If the error bit ER_TMERR is set, (a) the TM 8 sets TM_R-TREQ for requesting a retransmission of the message, (b) the ALI 4 responds by setting AL_RTACK acknowledging the transmit request, and (c) the ALI 4 sets AL_TMREQ for requesting the TM 8 to receive the message from the TB 16 and transmission occurs as described above. Setting of AL_TMREQ on retransmission can be cleared; however, for example in cases where a priority message being transmitted is more important than retransmission of the present message.

In FIG. 1, the RM 14 is responsive to messages RXD1, 2 from buses 1, 2 connected to the transceiver of FIG. 4. There are three synchronization signals received by the CC 2. The bus jam signal synchronizes all CCs. Following the bus jam comes a preamble 40 which starts a digital phase locked loop (DPLL) 40 in the RM 14 and thereby synchronizes the data to a clock (CLK) internal to the CC 2. Third, by the use of Manchester encoding, each bit within the data signal includes a clock RMRXCLK at the one-half bit mark which is kept in synch with the clock (CLK).

Within the RM 14, each message RXD1, 2 from each bus 1, 2 is digitally filtered in Block 40. Second, the message is provided to a preamble detect circuit in Block 40.

From the preamble detect circuit in Block 40, the message is provided to the DPLL 40 for sampling at the center of each half-bit of the Manchester encoded message. The message is Manchester (MANC) decoded 42 as it is received and provided to a CRC checker 44. The CRC checker 44 is enabled after the preamble and disabled before the postamble. A CRC error signal RM_CRC is provided to the EC 12 for indicating transmission errors.

A MUX 46 receives the two messages from bus 1 and bus 2 and, based on the preamble detected, selects one of the two buses.

Figure 5:
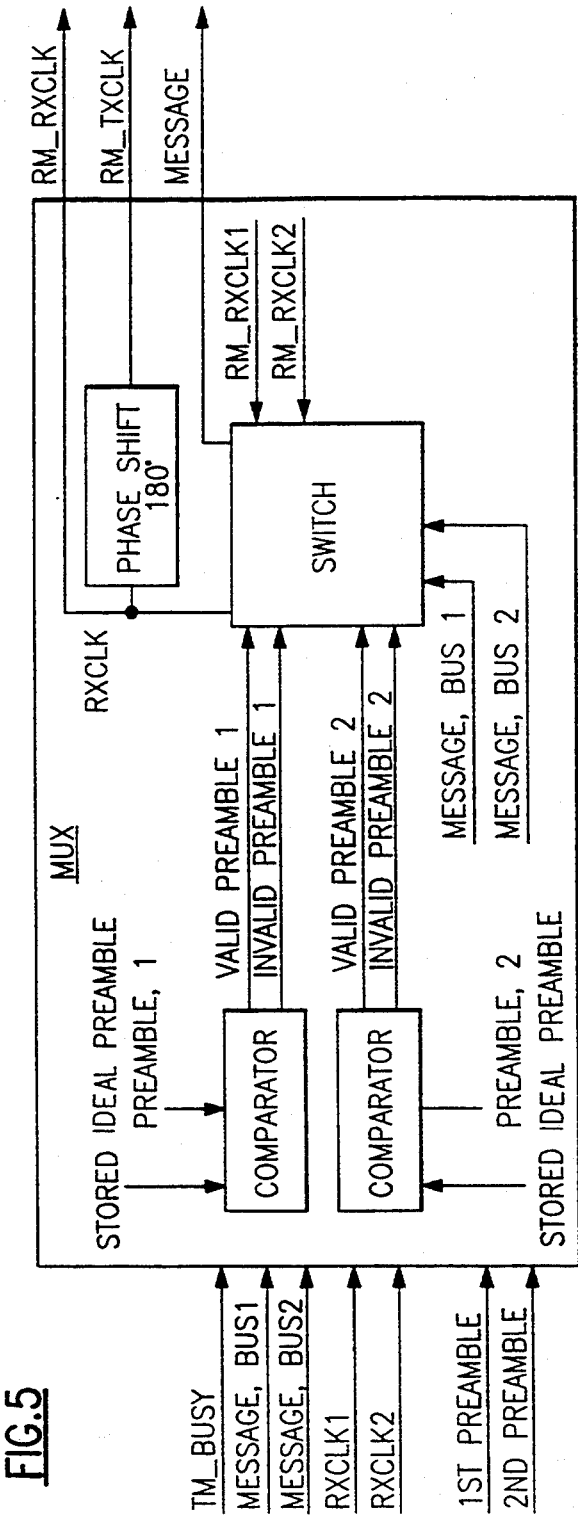
FIG. 5 is a block diagram of a multiplexer.

Beginning with the preamble, the receive machine MUX 46 shown in FIG. 5 receives the message from each bus 1, 2. The receive machine MUX 46 receives a clock signal RXCLK (twice the bit time of the Manchester encoded data signal) synchronized with the data received from each bus. The receive machine MUX 46 is responsive to the transmitter busy signal (TM_BUSY) because the MUX 46 cannot switch from one bus to the other bus while the transmitter is busy without a risk of causing phase errors between RXCLK1 and RXCLK2.

Within the MUX 46, first and second preambles 1, 2 from the buses 1, 2 are compared with identical stored ideal preambles second comparators 48, 49

The first comparator 48 is responsive to a first preamble, 1 at the beginning of a first message and an ideal preamble, for comparing the first preamble and the ideal preamble, and for providing a first valid preamble 1 signal if the first preamble and the ideal preamble agree but providing an invalid first preamble 1 signal if the first preamble and the ideal preamble do not agree.

The second comparator 49 is responsive to a second preamble, 2 at the beginning of a second message and the ideal preamble, for comparing the second preamble and the ideal preamble, and for providing a valid second preamble 2 signal if the second preamble and the ideal preamble agree but providing an invalid second preamble 2 signal if the second preamble and the ideal preamble do not agree. If both preambles 1, 2 compare favorably with the stored ideal preamble, the MUX does not switch from the bus presently selected for providing the message. If neither preamble compares favorably with the stored ideal preamble, there is a transmission error. If the preamble from one bus presently selected in switch 50 for output from the MUX 46 does not compare favorably with the stored ideal preamble, the other bus is selected for providing the message to a parallel to serial converter 52 of the RM 14 if its preamble compares favorably with the stored ideal preamble.

Figure 6:
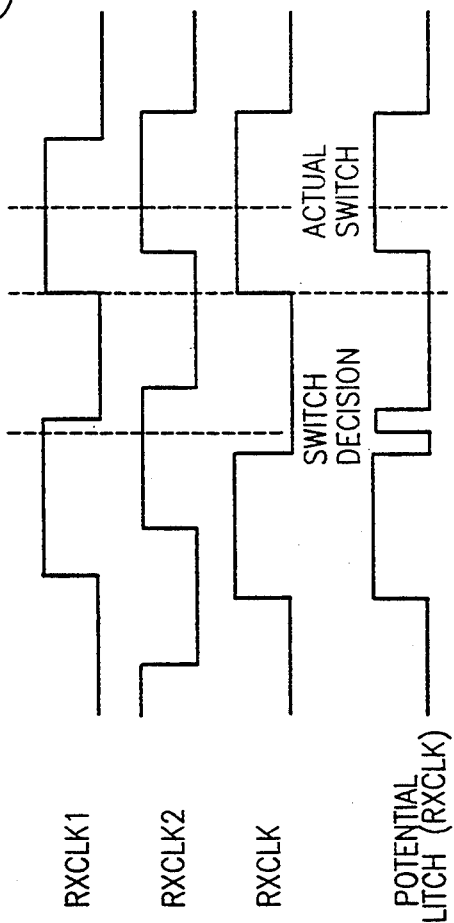
FIG. 6 is a timing diagram.
Figure 7:
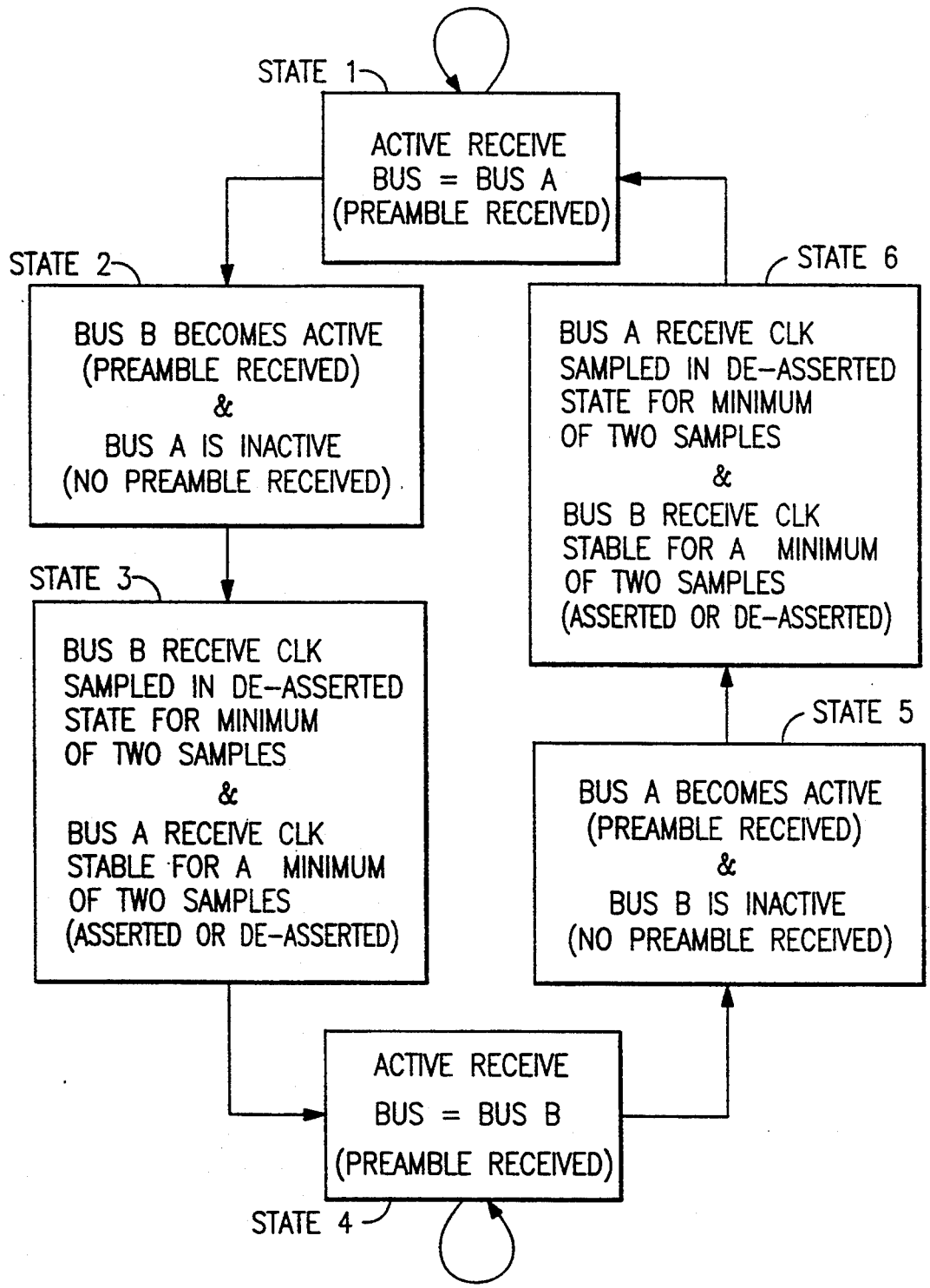
FIG. 7 is a state diagram of an alternate multiplexer.

FIG. 6 shows the timing RXCLK1 with respect to RXCLK2 during the switch from the bus 1 clock to the bus 2 clock. The switching from bus 2 to bus 1 is similar. Because the sampling takes place at the half point of each bit of the Manchester encoded message, the switch from bus 1 to bus 2 takes place within one quarter of the bit time. In this way, the switch takes place before the next bit in the data stream; here, a bit of the sender ID. In sum, the MUX 46 switches from one bus to another based upon the preamble so that the message provided to the parallel to serial converter has a greater likelihood of being error-free. The output of RXCLK of the MUX 46 follows RXCLK1 prior to the switch decision, at which point an invalid preamble on bus 1 is detected. If the switch were made at this point, a glitch would result in the MUX output RXCLK. Therefore, the switch is actually made later when both inputs RXCLK1, 2 are in the same state and have remained in this state for at least a minimum but not a maximum time so that the switch takes place near the center of a clock pulse of both clock signals RXCLK1, 2. To this end, the MUX 46 is responsive to a minimum time, a maximum time, and the clock signals RXCLK1, 2. By switching near the center of a pulse from both clock signals RXCLK1, 2, a glitch is avoided.

FIG. 8 is an alternative illustration of the bus switching scheme shown in FIGS. 5 and 6, in a state diagram. In state 1, the receive machine 14 has bus 1 as the active bus from which messages are taken. In state 2, bus 2 is active because a preamble is received from it. In state 2, no preamble is received from bus 1. In state 3, bus 2's receive clock signal is sampled in a de-asserted state for at least two samples and the receive clock for bus 1 is sampled for at least two samples (whether in the de-asserted state or in the asserted state). Then, in state 4, bus 2 is the active bus from which messages are received. States 5 and 6 are similar to states 2 and 3.

Returning to FIG. 1, when the RM 14 receives a message identifier (MID) byte within RXD1 or 2 (depending on which was selected by the circuit of FIG. 9) for determining if the RM 14 wants to accept a message, the RM 14 provides an MID request signal (RM_MIDREQ) to an MID lookup table in the ALI 4 for requesting that the MID byte in the received message be compared against the MID byte stored in the receiving CC 2. In response to the RM_MIDREQ signal, the ALI 4 provides an AL_MIDACK signal for acknowledging receipt of the MID request, and the RM 14 clears RM_MIDREQ. The RM 14 then provides an RM_MIDADR signal to the ALI 4 for locating the MID byte stored for the receiving node. If the MID of the message matches that for the receiving CC 2, the ALI 4 provides an RM_MID signal to the RM 14.

If the RM 14 is part of a bus controller (not shown), the RM 14 sends a message status byte (RM_MGSTAT) to the ALI 4. The message status byte is used to inform the AL 6 as to which protocol bytes (MID, LA, BA) match conditions set within the CC 2 so that a bridge (not shown) for connecting a group controller to a car controller can determine if an accepted message is for itself or is to be passed on to the next bus layer, for example, from a group control bus 2 or car control bus. A local address (LA) is an address directed to host processors local to a bus. A bus address (BA) is the address of a bus remote from the transceiver sending or receiving the message. The message status byte RM_MSGSTAT is illustrated in FIG. 9. A match is indicated by setting the associated bit to logic level 1.

A full receive machine buffer interrupt AL_INT will be generated to the AL 6 if the receive buffer 60 is full.

After the ALI 4 responds to the RM 14 with an AL_RMMID signal for indicating a match, the RM 14 provides an RM_BYTCNT signal to the ALI 4 for indicating the number of bytes in the message and then provides the message itself, RM_ALDAT signal.

The value of the CB within the data signal RM_AL-DAT instructs the RM 14 on the type of protocol bytes that exist within the packet and what conditions need to be met for the packet to be accepted at the node. Acceptance conditions differ between nodes depending on their location/function within the system. The conditions are pointed out in the table in FIG. 10.

Figure 10:
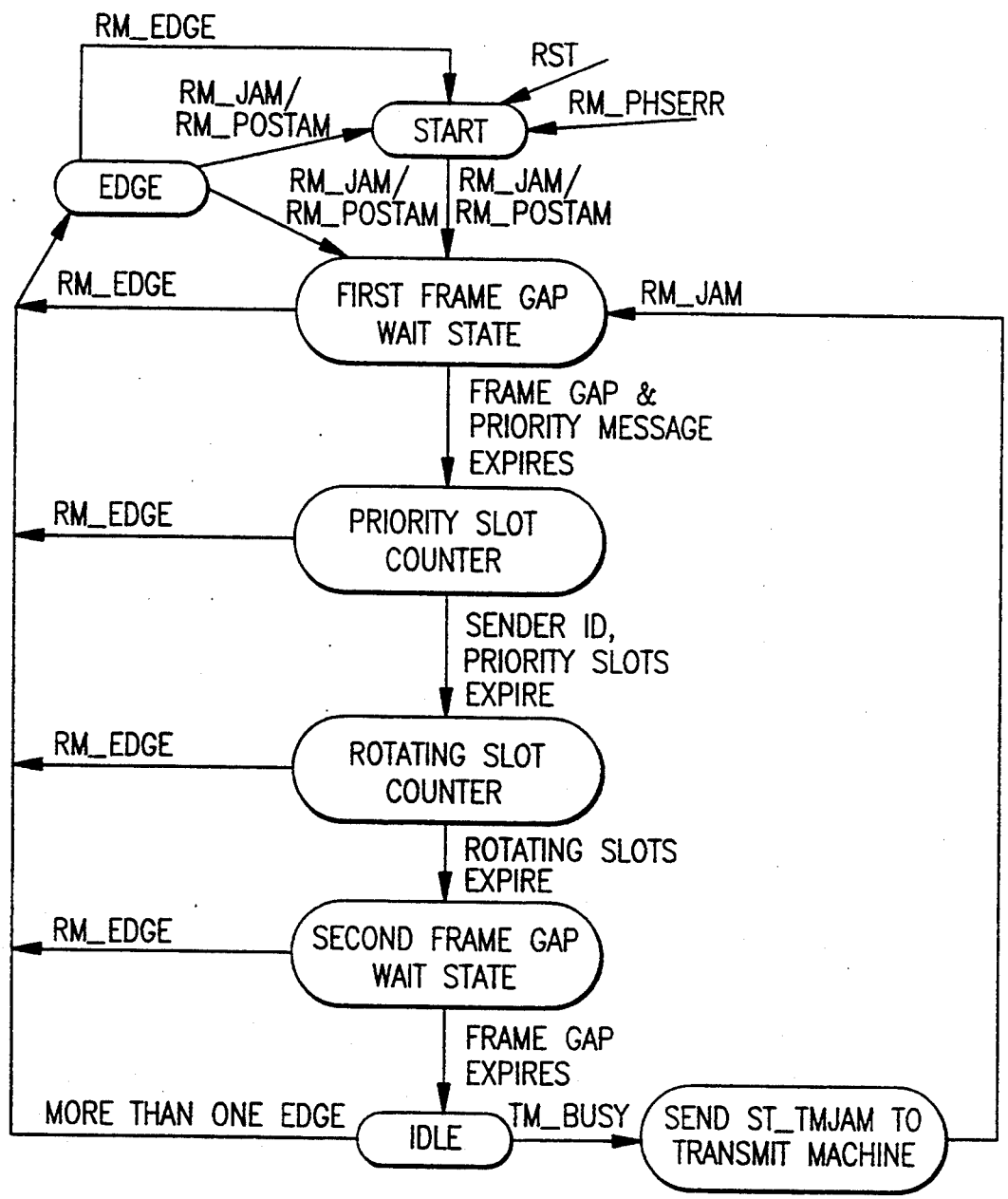
FIG. 10 is a state diagram of the operation of a slot timer.

FIG. 10 shows a table listing the conditions for acceptance of a packet by the RM 14. The RM 14 provides a valid message signal RM_VALDMSG to the AL 6 if the conditions are met. If the conditions are not met, the message is discarded. FIG. 10 shows node type for nodes of bus controllers. A node in a bus controller (not shown) is of one of four types: (a) for sending messages from a car bus to a group bus, (b) for sending messages from a group bus to a car bus, (c) for sending messages from a group bus to a building bus, or (d) for sending messages from a building bus to a group bus. Each message sent to a RM 14 has a control byte shown in Column 2.

Depending upon the node type and presence of certain bits within the control byte, acceptance conditions must be met for a message to be accepted at a node.

Three general statements can be made about conditions for acceptance of a message at a node. If the car-to-group copy bit or group-to-building copy bit is set, then the message is accepted and passed on to the group bus or building bus, respectively. If the message is received at a bridge, the message is passed upward in the hierarchy, that is, either from a car bus to a group bus or a group bus to a building bus, if the GBA or CBA do not match. If a message is received at a bridge (not shown) and the fields CBA or GBA do not match, the message is sent down in the bus hierarchy, that is, either from the building bus to the group bus or the group bus to the car bus.

In case A, if neither the bus address nor the local address is present, the MID byte in the packet must match that stored in the CC 2. In case B, if the local address bit is in the control byte, but the bus address bit is not, the value of the local address bit and MID byte must match the local address bit and MID byte, respectively, stored in the CC 2. In case C, if the bus address bit but not the local address bit is in the CC 2, the group bus address (GBA) and car bus address (CBA) must match the GBA and CBA stored in the receiving CC 2. In case D, if both the bus address and local address bits are in the control byte, the GBA, CBA, local address, and MID values must match the corresponding values stored in the receiving CC 2. Cases A-D show the conditions required for acceptance of a message at a generic node as opposed to a node residing in a bridge (not shown).

Therefore, in case E, if a node is a car to group node for passing messages in the up direction, and the bus address bit is in the control byte, but the GBA nibble in the message does not match that in the CC 2, the message will be accepted. In case F, if the car to group copy bit is present in the control byte, the message will not be accepted at a node for passing messages from the car bus to the group bus. In case G, if the bus address bit in the control byte is set and the GBA and CBA match the corresponding values in the CC 2, the message will be accepted at a bridge (not shown) for passing messages from the group bus to the car bus. The GBA must match to show which group bus and car bus have a match such that the car bus that wants the message gets it. In case H, if the bus address bit is in the control byte, but the GBA does not match the value stored in the CC 2, the message will be accepted at a bridge for passing messages from the group bus to the building bus. The bus address is set, but did not match the value stored in the receiving CC 2 so the message is sent from the group bus (not shown) to the building bus (not shown). In case I, if a group to building copy bit is set, a message will be accepted at a bridge for passing messages from the group bus to the building bus (not shown). In case J, if the bus address bit is set in the control byte and the GBA matches the value stored in the CC, the message will be accepted at a bridge (not shown) for passing messages from the building bus (not shown) to the group bus (not shown).

If the message has no errors in it, the RM 14 provides an RM_VALMSG signal to the ALI 4 indicating that a valid message has been transmitted. Receipt of a phase error or postamble anytime during packet processing will cause the valid message signal RN_VALMSG to not be set, causing the AL 6 to discard the message.

For EC 12, the RM 14 provides RM_RXCLK, RM_POSTAM, RM_PHERR, RM_EDGE, RM_JAM, and RM_TXCLK to the error control.

The ST 10 receives RM_RXCLK, RM_POSTAM, FM_PHERR, RM_EDGE, RM_JAM, and RM_TXCLK for determining if the bus is busy or idle, and for counting the number of slots that have passed. The ST 10 provides ST_TMGO to tell the TM 8 that the TM 8 may transmit and an ST_IDLE signal to tell the TM 8 that the bus is idle and the TM 8 must jam the bus prior to sending a message. The ST 10 receives TM_CPT so that it can count slots until the TM's slot is available. The ST 10 receives the priority signal AL_TMPVAL so that ST_TMGO can tell the TM 8 to transmit a priority level signal from the AL 6 in a priority slot (as opposed to a rotating slot). The rotating slot a message is sent in is determined by the nodes SENDER_ID. But if AL_TMPVAL is set, the SENDER_ID is ignored, and the priority value of AL_TMPVAL is used to determine which priority slot the message will be transmitted in.

Figure 11:
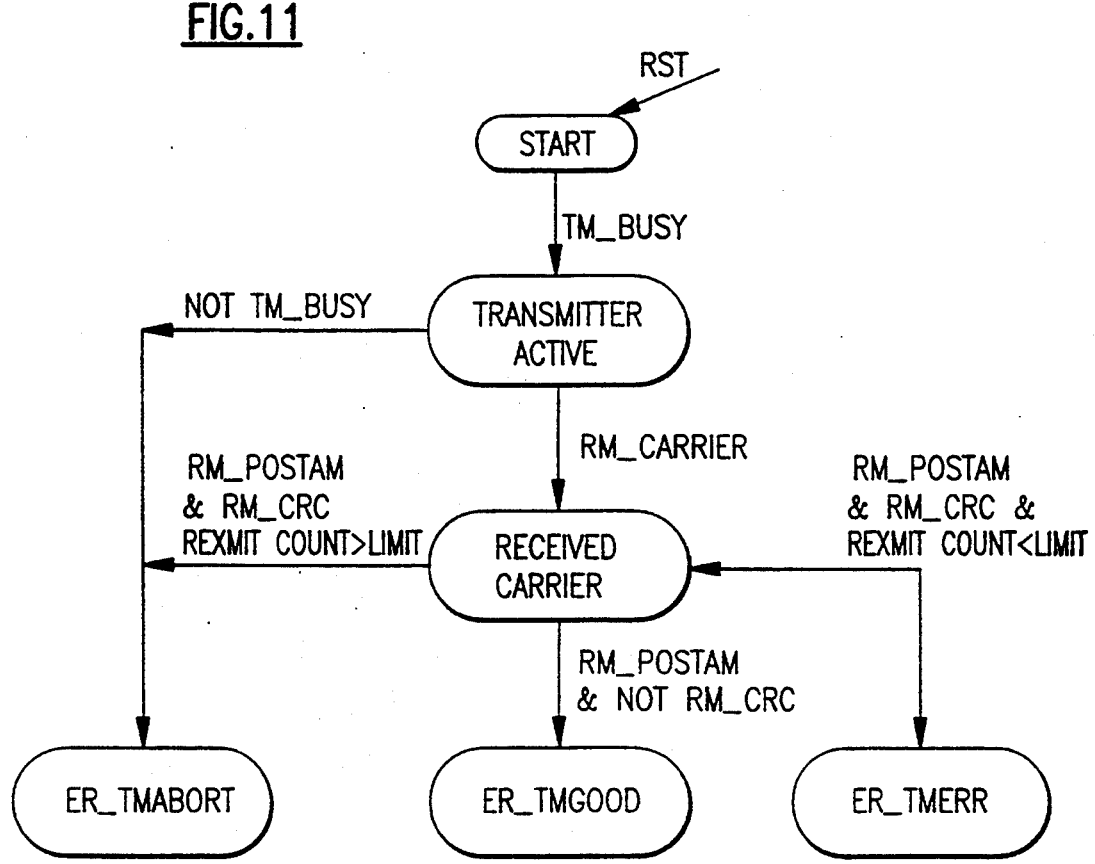
FIG. 11 is a state diagram of the operation of the error control.

The function of the ST 10 is illustrated in the finite state machine of FIG. 11. When the ST 10 receives a reset signal (RST) or power-up signal or a phase-out RMPHERR (provided from the RM 14 when the Manchester encoded received signal includes two adjacent half-bits of the same polarity), the ST 10 is in the START state. In the START state, a first frame gap timer starts. If the ST 10 receives a jam signal, RM_

JAM, from the RM 14 and a postamble signal, RM—POSTAM, the ST 10 enters a FIRST FRAME GAP WAIT STATE. If the first frame gap time expires and the TM 8 has a priority message to transmit as indicated by a non-zero priority signal ALTMPVAL, then the ST 10 enters a PRIORITY SLOT COUNT STATE. In the PRIORITY SLOT COUNT STATE, the ST 10 counts up to a number of priority time slots equal to the value in the priority signal, ALTMPVAL. When the ST 10 has counted so high, the ST 10 provides a signal ST_TMGO to the TM 8 for telling the TM 8 that its slot on the bus is currently available. If the first frame gap expires, but the TM 8 has no priority message to send as indicated by a zero value, ALTMPVAL, the ST 10 enters a ROTATING SLOT COUNT STATE. The ST 10 also enters the ROTATING SLOT COUNT STATE if all the priority slots expire and the ST 10 receives a sender ID signal RM_SID from the RM 14. In the ROTATING SLOT COUNT STATE, the ST 10 counts the rotating slots expiring on the bus, by means of RXCLK, until the number of expired rotating slots equals a rotating slot value stored in the ST, at which point the ST 10 provides the signal ST_TMGO to the TM 8 for telling the TM 8 that its slot is available. The ST 10 needs the SENDER ID of the CC 2 most recently transmitting so that the ST 10 may count the slots until the counted slots reach the stored rotating slot value. Thus, if a TM 8 with sender ID of 7 learns that the TM 8 with sender ID of 3 just transmitted, the TM 8 will count three rotating slots. The ST 10 need not know the sender ID of the last transceiver providing a priority message onto the bus because the priority messages are assigned to fixed, not rotating, slots. After expiration of all rotating slots, the ST 10 enters a second frame gap state for waiting for a frame gap to expire. After expiration of the second frame gap, the ST 10 goes idle. If the ST 10 receives a TM_BUSY signal, the ST 10 provides a ST_TMJAM signal to the TM 8. When the ST 10 receives RM_JAM, the ST 10 returns to the FIRST FRAME GAP WAIT STATE.

If the ST 10 receives an edge signal, RM_EDGE, while in the START state, the ST 10 enters an EDGE state and waits until the ST 10 receives RM_JAM and RM_POSTAM, at which point the ST 10 enters the FIRST FRAME WAIT STATE or the ST 10 detects that both RM_JAM and RM_POSTAM are inactive, at which point the ST 10 enters the START state.

If the ST 10 receives an edge signal while in any state, but the IDLE state, the ST 10 enters the EDGE state. If the ST 10 receives more than one edge during the IDLE state, the ST 10 enters the EDGE state.

The EC 12 detects several errors in transmission and reception. The EC 12 detects a Lost Carrier Sense error in response to a TM_BUSY signal and several RM_EDGE signals within a short period. The EC 12 detects a CRC Error Following Transmission in response to a TM_BUSY signal, an RM_CRC signal, and an RM_POSTAM. The EC 12 detects that a transmission was completed without a CRC error in response to TM_BUSY, RM_CRC, and RM_POSTAM. The EC 12 detects that no jam was detected at the jamming node and responds to ST_TMJAM and RM_JAM. The RM 14 detects a CRC error during message reception and responds to the RM_CRC signal and the RM_POSTAM signal. The EC 12 detects a phase error with a CRC error during reception and responds to an RM_PHERR signal and RM_CRC signal, and RM_POSTAM signal. The EC 12 detects a partial message reception in response to the RM_PHERR phase error signal. The EC 12 detects that a valid message was received and responds to the RM_CRC signal and the RM_POSTAM signal.

FIG. 11 shows a state diagram for generating ER_TMABORT, ER_TMGOOD, and ER_TMERR. After the EC 12 is started and receives TM_BUSY, the EC 12 enters the TRANSMITTER ACTIVE state. If the EC 12 receives RM_CARRIER, a signal for indicating that the RM 14 has received several RM_EDGE signals in a short time, the EC 12 enters the RECEIVED CARRIER state. If EC 12 then receives RM_POSTAM and RM_CRC, the transmission is assured to be good and the EC 12 provides ER_TMGOOD to the TM. If the EC 12 receives RM_POSTAM and RM_CRC and a retransmission counter (for counting the number of times a message is retransmitted) has counted beyond a limit, the EC 12 tells the TM 8 to abort the transmission using an abort signal ER_TMABORT. If, while the EC 12 is in the RECEIVED CARRIER state, the EC 12 receives RM_POSTAM and RM_CRC and the retransmit counter has not exceeded the limit, the EC 12 tells the TM 8 that an error has occurred with ER_TMERR. If while the EC 12 is in the TRANSMITTER ACTIVE state, the EC 12 senses that TM_BUSY has been turned off, then the RM 14 never got a carrier signal (several RM_EDGEs) from either bus and the transmission is aborted. If the EC 12 receives RM_CARRIER for a period of time and TM_BUSY is off for that period, the EC 12 provides ER_RXENB to the RM 14 to tell it that messages may be received on buses 1, 2.

It should be understood by those skilled in the art that various changes, omissions, and additions may be made herein without departing from the spirit and scope of the invention.

We claim:

1. A multiplexer responsive to a first message on a first bus and a second message on a second bus for selecting one of said messages, comprising:

a first comparator responsive to a first preamble at the beginning of said first message and an ideal preamble for comparing said first preamble and said ideal preamble and for providing a valid first preamble signal if said first preamble and said ideal preamble agree and providing an invalid first preamble signal if said first preamble and said ideal preamble do not agree;

a second comparator responsive to a second preamble at the beginning of said second message and said ideal preamble for comparing said second preamble and said ideal preamble and for providing a valid second preamble signal if said second preamble and said ideal preamble agree and providing an invalid second preamble signal if said second preamble and said ideal preamble do not agree; and switching means for providing said second message in response to said valid second preamble signal and said invalid first preamble signal, and for providing said first message in response to said valid first preamble signal and said invalid second preamble signal.

2. A method for selecting a message to be provided to the output of a multiplexer, responsive to a first message on a first bus and a second message on a second bus, from said first message and said second message, comprising:

receiving said first message including a first preamble on said first bus;

receiving said second message including a second preamble on said second bus;

comparing said first preamble with an ideal preamble for providing a valid first preamble signal if said first preamble and said ideal preamble agree and an invalid first preamble signal if said first preamble and said ideal preamble do not agree;

comparing said second preamble with said ideal preamble for providing a valid second preamble signal if said second preamble and said ideal preamble agree and an invalid second preamble signal if said second preamble and said ideal preamble do not agree;

providing said second message in response to said valid second preamble signal and said invalid first preamble signal; and providing said first message in response to said invalid second preamble signal and said valid first preamble signal.

* * * * *